United States Patent
Davis et al.

(10) Patent No.: US 7,757,235 B2
(45) Date of Patent: Jul. 13, 2010

(54) TRIGGER SUPPORT FOR A BI-DIRECTIONAL BROKER

(75) Inventors: Bradford C. Davis, Erie, CO (US); Nick Minchenko, Lewis Center, OH (US)

(73) Assignee: Computer Associates Think, Inc., Islandia, NY (US)

( * ) Notice: Subject to any disclaimer, the term of this patent is extended or adjusted under 35 U.S.C. 154(b) by 1211 days.

(21) Appl. No.: 10/890,312

(22) Filed: Jul. 12, 2004

(65) Prior Publication Data

US 2005/0010923 A1    Jan. 13, 2005

Related U.S. Application Data

(60) Provisional application No. 60/486,753, filed on Jul. 11, 2003.

(51) Int. Cl.
*G06F 9/46* (2006.01)
*G06F 13/00* (2006.01)

(52) U.S. Cl. .................. 718/102; 718/100; 719/318

(58) Field of Classification Search ................. 718/102, 718/100, 104; 719/318, 328; 709/202, 203, 709/318
See application file for complete search history.

(56) References Cited

U.S. PATENT DOCUMENTS

| | | | |
|---|---|---|---|
| 5,774,668 A * | 6/1998 | Choquier et al. ............ 709/223 |
| 5,812,768 A * | 9/1998 | Page et al. .................. 709/228 |
| 5,889,944 A | 3/1999 | Butt et al. |
| 6,026,424 A * | 2/2000 | Circenis .................... 718/104 |
| 6,205,482 B1 * | 3/2001 | Navarre et al. ............. 709/227 |
| 6,304,967 B1 * | 10/2001 | Braddy ....................... 713/150 |
| 6,466,914 B2 * | 10/2002 | Mitsuoka et al. ............... 705/9 |
| 6,480,883 B1 * | 11/2002 | Tsutsumitake ............. 709/203 |
| 6,598,067 B1 * | 7/2003 | Wydra et al. ................ 718/100 |
| 6,718,332 B1 * | 4/2004 | Sitaraman et al. ........... 707/102 |
| 6,871,223 B2 * | 3/2005 | Drees ......................... 709/223 |
| 2002/0052954 A1 | 5/2002 | Polizzi et al. |
| 2002/0116248 A1 * | 8/2002 | Amit et al. ..................... 705/9 |
| 2003/0208548 A1 * | 11/2003 | Wydra et al. ................ 709/206 |

(Continued)

FOREIGN PATENT DOCUMENTS

EP    1172746 A2 *    1/2002

(Continued)

OTHER PUBLICATIONS

Shen, "Distributed manufacturing scheduling using intelligent agents", IEEE, 2002, pp. 1-7.*

(Continued)

*Primary Examiner*—Meng-Ai An
*Assistant Examiner*—Caroline Arcos
(74) *Attorney, Agent, or Firm*—Baker Botts L.L.P.

(57) ABSTRACT

A trigger support system and method for a bi-directional job broker is provided. One or more action requests, or triggers, are registered, for example, by a manager job scheduler or a broker. The one or more action requests are associated with one or more jobs scheduled to run on a client job scheduler. A broker communicates the one or more action requests to the client job scheduler. The client job scheduler takes an action based on the one or more action requests and reports the result of the action to the manager job scheduler.

14 Claims, 2 Drawing Sheets

U.S. PATENT DOCUMENTS

2004/0030741 A1* 2/2004 Wolton et al. ............... 709/202
2004/0193918 A1* 9/2004 Green et al. ................ 713/201

FOREIGN PATENT DOCUMENTS

WO      WO 97/34219      9/1997
WO      WO 02/095610 A1      11/2002

OTHER PUBLICATIONS

Adebayo et al., "A performance study of client-broker-server systems", ACM, 1997, pp. 1-15.*

Platinum Technology ("Platinum AutoSys user manual for Unix", version 3.3; 1996, pages: Toc-1—operations center-14).*

EPO Supplementary Search Report; Reference HCD/J00048472EP; Application No./Patent No. 04778164.6-1243, PCT/US2004022522, May 6, 2008.

EPC, Communication pursuant to Article 94(3) EPC, notification regarding Application No. 04 778 164.6-1243, Ref. HCD/J00048472EP, 6 pages, Jul. 24, 2009.

* cited by examiner

TRIGGER SUPPORT FOR A BI-DIRECTIONAL BROKER

CROSS-REFERENCE TO RELATED APPLICATIONS

This application claims the benefit of U.S. Provisional Patent Application No. 60/486,753 entitled UNICENTER WORKLOAD TRIGGER SUPPORT FOR A BI-DIRECTIONAL BROKER filed on Jul. 11, 2003, the entire disclosure of which is incorporated herein by reference.

TECHNICAL FIELD

This application relates generally to computer systems, and more particularly to bi-directional scheduling in computer systems.

BACKGROUND

Automatic job management systems and workload scheduler systems both work to manage various processes running in enterprise-wide applications. Currently, a number of job management and scheduler systems are available, for example, from different software vendors. In some cases, the same vendor may be marketing a number of different job management and scheduler systems. Thus, a company or an enterprise may be running different job management and schedulers on the company's systems. Accordingly, it is desirable to allow these different job management and schedulers to communicate the jobs they are running with one another.

SUMMARY

A trigger support system and method for a bi-directional job broker is provided. The system in one aspect includes a manager job scheduler operable to register one or more action requests. The one or more action requests are associated with one or more jobs scheduled on a client job scheduler. A broker is enabled to receive the one or more action requests registered by the manager job scheduler. A client job scheduler receives the one or more action requests from the broker and takes an action based on the one or more action requests and reports the result of the action. An example of one or more action requests include status information on a job scheduled to run on the client job scheduler. An action that the client job scheduler takes based on the one or more action requests may include invoking an event to report back a status of a job when that job is running or has completed. In another aspect, the broker may interrogate the manager job scheduler for interested jobs and register the one or more action requests.

The method in one aspect includes registering one or more action requests, transmitting the one or more registered action requests to a client job scheduler, converting the one or more registered action requests into one or more events in the client job scheduler, the one or more events associated with a job scheduled on the client job scheduler, and sending one or more messages associated with the one or more events as a result of the job being run.

Further features as well as the structure and operation of various embodiments are described in detail below with reference to the accompanying drawings. In the drawings, like reference numbers indicate identical or functionally similar elements.

DETAILED DESCRIPTION

The present application relates to workload trigger support for a bi-directional broker, and more particularly, to bi-directional scheduling. Embodiments of the present application can integrate, for example, the Unicenter AutoSys™ and the Unicenter Workload™ Job Schedulers. Trigger is a term used in workload to denote action taken by the Workload Manager (WLM) on startup as it pertains to external processes. In this case, the external process is AutoSys. The trigger registers external jobs that AutoSys will perform and report on, on behalf of the Workload Manager. For example, the Workload Manager registers jobs in AutoSys, to be run under AutoSys, on behalf of Workload. The AutoSys provides statuses of those jobs by converting the statuses to Workload understandable statuses and reports back to the Workload Manager.

Figure 1:
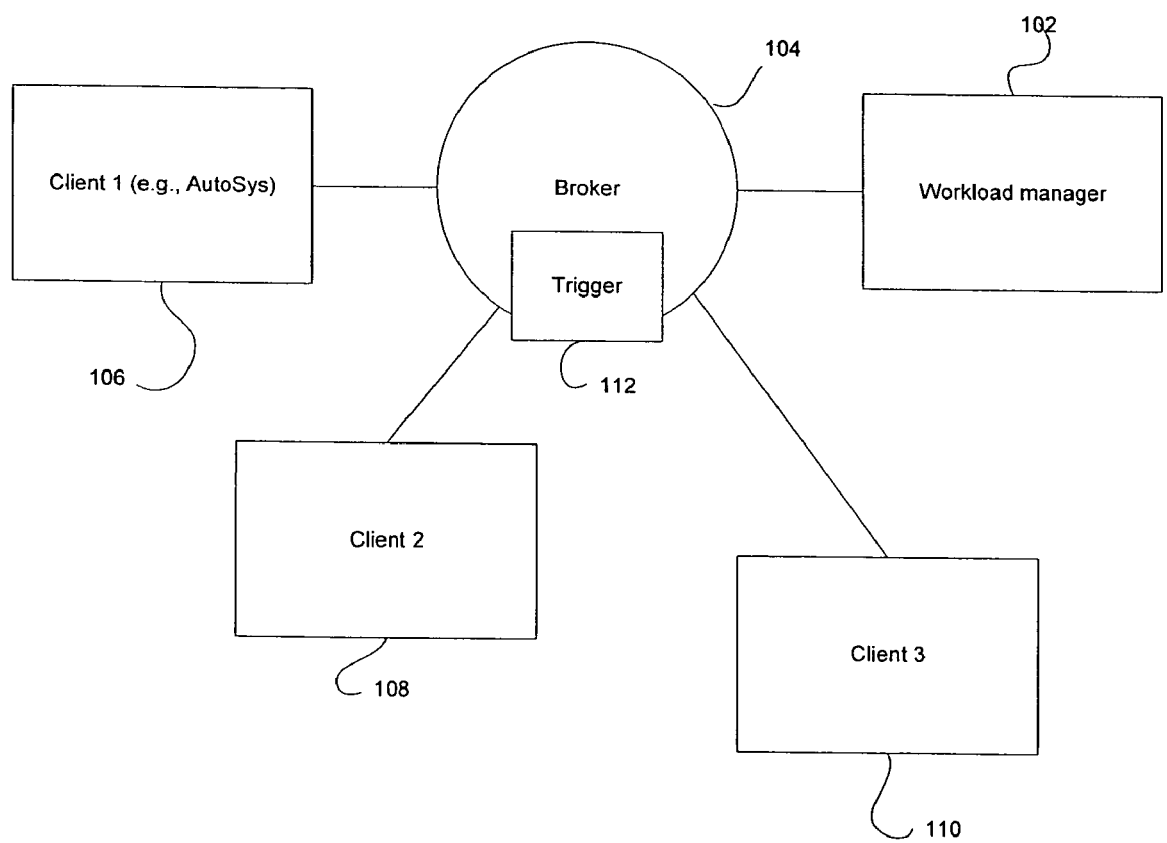
FIG. 1 is a block diagram illustrating components of the present disclosure in one embodiment.

FIG. 1 is a block diagram illustrating components of the present disclosure in one embodiment. In one embodiment, Workload Manager 102 communicates with AutoSys 106 via a process known as the broker (asbIII) 104. When WLM 102 starts, it reaches out to its list of clients 106, 108, 110 and registers its triggers with those clients or agents. The agents 106, 108, 110, upon receipt of those triggers take appropriate actions and report back to WLM 102. A trigger 112 may include a set of conditions registered on the agents 106, 108, 110 that the agents review prior to doing the work for the manger 102. As part of this handshake, or exchange of triggers, the broker 104 can interrogate the startup message from WLM 102 and realize an interest on the part of WLM 102, for a particular set of jobs known to be pre-registered in AutoSys 106 or other clients 108, 110. In effect, WLM 102 is saying, 'AutoSys, I know you have these jobs that you may run at some point. When you do, tell me when you have started any of them and also tell me what the termination status is.'

In an exemplary embodiment, the jobs are not added to AutoSys 106 or other clients 108, 110. They exist in the AutoSys database and have been put there by the standard means available under AutoSys 106 or other clients 108, 110. Also, any component of the job definition is not changed. Given the fact that the job or jobs have been properly inserted in AutoSys 106, and given knowledge of that to the user of WLM 102, this functionality allows WLM 102 to register in AutoSys 106, the request for statuses when these jobs are run under AutoSys 106. This happens, for example, according to the job definition as it was defined in AutoSys 106.

In one embodiment, the bi-directional broker 102 includes two implied directions: inbound and outbound. These implied directions are from the standpoint of AutoSys which is, for instance, the client 106. So 'inbound' means coming into AutoSys 106 from WLM 102. Outbound means the opposite, leaving AutoSys 106 bound for WLM 102.

As noted, the broker 104 can work WLM 102 and AutoSys 104 in a bi-directional fashion. For instance, WLM 102 is the manager and AutoSys 106 is the client, or, alternatively, AutoSys 106 is the manager and WorkLoad 102 is the client. In the latter case, AutoSys communicates with a Workload Agent.

Figure 2:
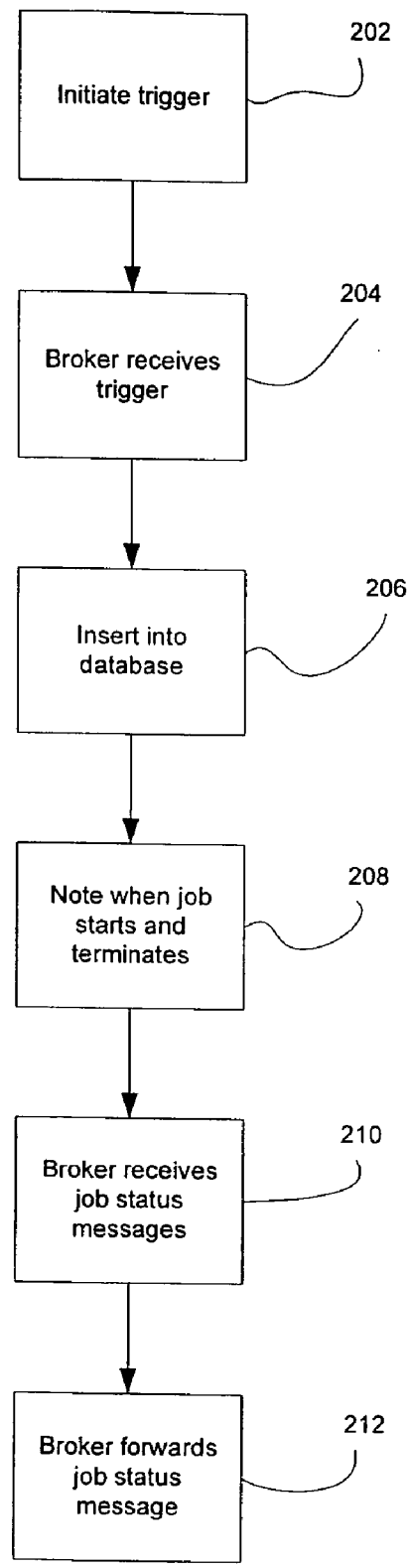
FIG. 2 is a flow diagram illustrating the method of the present disclosure in one embodiment.

FIG. 2 is a flow diagram illustrating the method of the present disclosure in one embodiment. A job is inserted into the AutoSys database and the user on Workload has knowledge of that job. Given that, either WLM or the asbIII, a broker initiates contact at 202. Either the WLM was up, and the broker came up, or vice-versa. As part of that initial contact, the WLM sends to the client (for example, AutoSys) via the broker (for example, asbIII), its triggers at 204. The broker decomposes those triggers into AutoSys events and puts those events into the req_job table of the AutoSys database at 206. The existence of this event tells the event_demon at 208, that WLM is interested in the statuses of that job. The job will run on the conditions set in the job definition. This is done independently of WLM, the broker, or the triggers. But because this event is now registered in the AutoSys database, when the job does run, a message will be sent from the event_demon to the outbound side (asbIII) and the broker will take that message at 210, convert it into something WLM can understand and send it to the WLM at 212.

Thus, the flow of this functionality is in that direction in one embodiment. Initiated by WLM, received by the asbIII, inserted into the database, the event_demon then notes when the job starts and terminates. The event_demon then passes a message to the broker and the broker forwards an appropriate message or job status, back to WLM.

The functionality provided by the exemplary embodiments is generally referred to as Trigger Support for the Workload Manager in AutoSys. The particular trigger described herein deals with registration of external jobs that AutoSys will perform and report on, on behalf of the Workload Manger. The present application describes in one embodiment, from the standpoint of AutoSys, Workload registration of jobs in AutoSys to be run under AutoSys on behalf of WorkLoad; and how the AutoSys statuses of those jobs are converted into Workload statuses and reported back to Workload.

In one embodiment, architectural changes do not need to be made to incorporate this functionality although changes in both the asbIII and event_demon which belong to the product AutoSys are changed. Those changes are described herein.

In the present application in one embodiment, AutoSys is considered as a client of Workload. AutoSys, for example, may be a particular type of client. It can register, run and report on jobs, on behalf of Workload. It does not, however, need to insert these jobs into AutoSys on behalf of Workload.

The system of the present disclosure may include modules to add and delete events to be processed in Autosys as a result of triggers inserted into the broker.

The system and method of the present disclosure may be implemented and run on a general-purpose computer. For example, the system and method may be implemented as set of computer instructions to be stored on computer memory units and executed on the computer processor. The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A trigger support system, comprising:
a processor configured to execute processes of a manager job scheduler, the manager job scheduler being operable to register one or more action requests with a client job scheduler, the one or more action requests associated with one or more existing jobs scheduled on the client job scheduler, each of the one or more existing jobs scheduled independently of the manager job scheduler and comprising a respective job definition comprising job run conditions, and wherein the one or more action requests include one or more requests for statuses of one or more jobs running on the client job scheduler;
a broker enabled to receive the one or more action requests registered by the manager job scheduler;
the broker further enabled to send the one or more action requests to the client job scheduler; and
the client job scheduler operable to receive the one or more action requests from the broker, the client job scheduler further operable, after one of the one or more existing jobs begins to run according to its respective job definition, to take an action based on the one or more action requests and report a result of the action to the manager job scheduler.

2. The system of claim 1, wherein the client job scheduler reports the result of the action to the manager job scheduler via the broker.

3. The system of claim 1, wherein the broker is further enabled to convert the one or more action requests into one or more events and transmit the one or more events to the client job scheduler.

4. A trigger support system, comprising:
a manager job scheduler;
a processor configured to execute processes of a broker, the broker being operable to interrogate the manager job scheduler to register one or more action requests with a client job scheduler, the one or more action requests associated with one or more existing jobs scheduled on the client job scheduler, each of the one or more existing jobs scheduled independently of the manager job scheduler and comprising a respective job definition comprising job run conditions, and wherein the one or more action requests include one or more requests for statuses of one or more jobs running on the client job scheduler; and
the client job scheduler operable to receive the one or more action requests from the broker, the client job scheduler further operable, after one of the one or more existing jobs begins to run according to its respective job definition, to take an action based on the one or more action requests and report a result of the action to the manager job scheduler.

5. The system of claim 4, wherein the client job scheduler reports the result of the action to the manager job scheduler via the broker.

6. The system of claim 4, wherein the broker is further operable to convert the one or more action requests into one or more events and transmit the one or more events to the client job scheduler.

7. A trigger support method, comprising:
registering one or more action requests with a client job scheduler, wherein the one or more action requests include one or more requests for statuses of one or more jobs running on the client job scheduler;
transmitting the one or more registered action requests from a manager job scheduler to the client job scheduler via a broker;
converting the one or more registered action requests, using the broker, into one or more events in the client job scheduler, the one or more events associated with an existing job scheduled on the client job scheduler, the existing job scheduled independently of the manager job scheduler and comprising a job definition comprising job run conditions; and
after the existing job begins to run according to its job definition, taking an action based on the one or more action requests and sending, from the client job scheduler to the manager job scheduler, one or more messages associated with the one or more events as a result of the job being run.

8. The method of claim 7, wherein the broker registers the one or more action requests.

9. The method of claim 7, wherein a manager job scheduler registers the one or more action requests.

10. The method of claim 7, further including converting the message into a manager job scheduler format.

11. A program storage device readable by machine, tangibly embodying a program of instructions executable by the machine to perform a trigger support method, comprising:

registering one or more action requests with a client job scheduler, wherein the one or more action requests include one or more requests for statuses of one or more jobs running on the client job scheduler;

transmitting the one or more registered action requests from a manager job scheduler to the client job scheduler via a broker;

converting the one or more registered action requests, using the broker, into one or more events in the client job scheduler, the one or more events associated with an existing job scheduled on the client job scheduler, the existing job scheduled independently of the manager job scheduler and comprising a job definition comprising job run conditions; and after the existing job begins to run according to its job definition, taking an action based on the one or more action requests and sending, from the client job scheduler to the manager job scheduler, one or more messages associated with the one or more events as a result of the job being run.

12. The program storage device claim 11, wherein the broker registers the one or more action requests.

13. The program storage device claim 11, wherein a manager job scheduler registers the one or more action requests.

14. The program storage device claim 11, further including converting the message into a manager job scheduler format.

* * * * *